Aug. 4, 1925.
T. MIDGLEY
1,548,370
TIRE
Original Filed Aug. 12, 1921
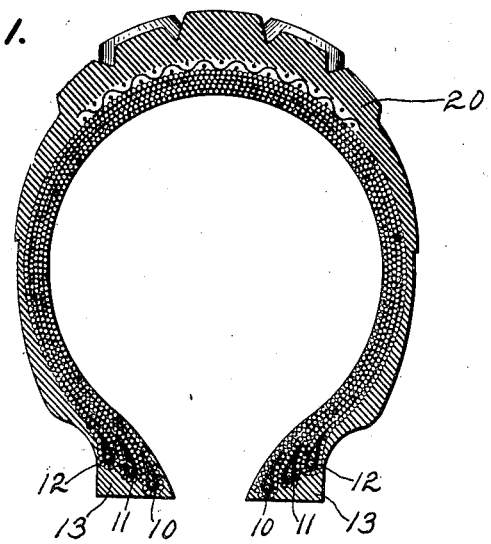
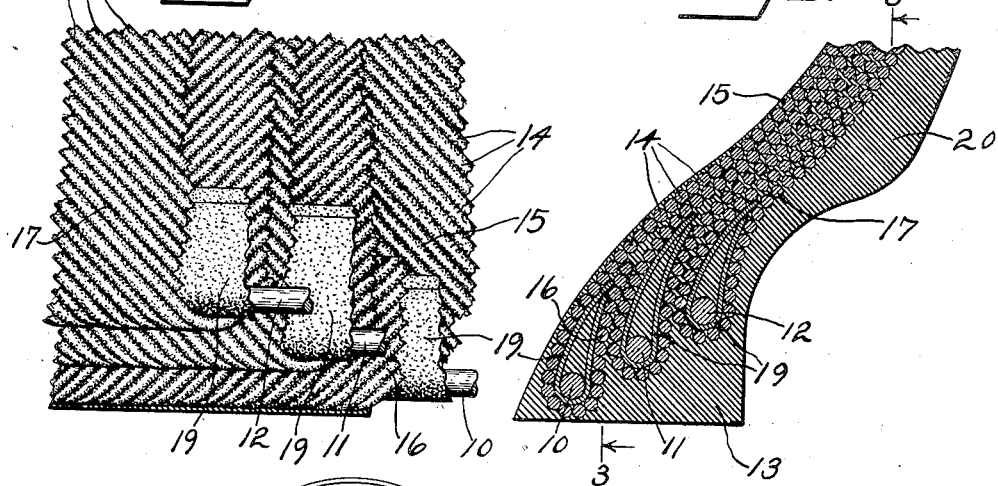
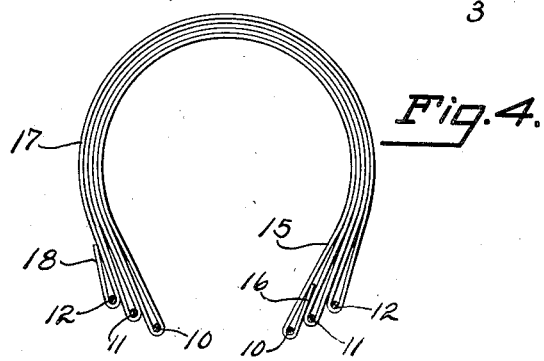
INVENTOR
THOMAS MIDGLEY
BY Edward C. Taylor
ATTORNEY Patented Aug. 4, 1925.

1,548,370

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE.

Application filed August 12, 1921, Serial No. 491,729. Renewed January 5, 1925.

*To all whom it may concern:*

Be it known that I, THOMAS MIDGLEY, a citizen of the United States of America, residing at Hampden, in the county of Hampden and State of Massachusetts, have invented certain new and useful Improvements in a Tire, of which the following is a specification.

My present invention relates to tire construction, and has for its object the improvement of tire casings in various aspects which will appear from the following description, particularly as to the manner in which the plies of material forming the carcass portion of the casing are anchored in the bead edges of the casing.

This application is a continuation in part of my application Serial No. 264,960, filed Dec. 2, 1918.

The invention will now be described with particular reference to the accompanying drawings, which show one form in which it may be embodied, and in which—

Fig. 1 is a cross section of a tire casing embodying the present improvements;

Fig. 2 is an enlarged detail section of one of the bead edges;

Fig. 3 is a view from the right in Fig. 2, substantially on line 3—3 of the latter figure, and showing the covering rubber of the plies removed; and Fig. 4 is a diagrammatic view showing one manner in which the plies of fabric may be laid.

In building a tire casing according to the present improvements the plies of material forming the carcass are folded around a plurality of anchorages 10, 11 and 12 in each bead edge 13, the anchorages, which may be inextensible wire hoops, being arranged coaxially in the bead and being of progressively larger diameters whereby they lie in nested relation. By using a bead anchorage as herein described, having the outer bead wires of greater diameter than the inner, and intermediate wires of an intermediate size, the lengths of path of the strain-resisting elements in successive layers may be equalized. Where the layers all run to the same diameter at the bead the length of the elements in the outer layers will be greater than the length of the inner layers due to their enveloping position. By this invention the cross-sectional periphery of each layer may be made equal by properly relating the diameter of the bead anchorage to the thickness of carcass underlying the ply being anchored. This will cause the elasticity of the elements to be substantially equalized throughout the carcass structure in a simpler and improved manner than is possible with other constructions, and the strains borne by the several plies to be more evenly shared. It is also possible by this invention to make a more compact bead. If this latter feature is particularly desired the beads may be compressed more than is shown in the figures, the nested arrangement of the bead anchorages permitting them to assume partially overlapping positions.

This arrangement of the bead anchorages is of course adaptable for various types of carcass construction, such as the fabric, cord fabric, or cord types. For illustration in the present case I have chosen a type of tire construction in which I believe this invention to have especial utility. In this type of construction, the carcass is formed of a circumferential series of cord members 14 which pass across the carcass in alternate directions so that the carcass is formed of a plurality of reversely folded courses of elements continuous throughout the several plies. This condition is shown perhaps best in Fig. 4, where the several plies are shown as if a single cord member passed back and forth across the carcass in a single plane, it being understood that the cords usually are disposed angularly as in Fig. 3. Referring for illustration to Fig. 4, the inner ply 15 is folded as at 16 around the right hand anchorage 10 to secure it in place. The material is then passed around the left hand anchorage 10 and back and forth across the carcass, passing around successive anchorages alternately at one side and the other of the casing until the desired number of plies has been built up. The last ply 17 may be secured as by folding at 18 around anchorage 12. If desired, suitable flipper strips 19 may enclose the anchorages and extend partially between adjacent plies looped about each anchorage. The tire may be completed by the addition of the usual covering materials 20.

Having thus described my invention, I claim:

1. A tire casing having a carcass portion composed of a plurality of plies of material laid across the carcass in reversely folded courses, and anchoring rings in each bead edge enclosed by said folds, the rings in each bead edge being coaxial and of progressively increased diameter.

2. A tire casing having a carcass portion composed of a plurality of plies of material laid across the carcass in reversely folded courses, and anchoring rings in each bead edge enclosed by said folds, the rings in each bead edge being coaxial and of progressively increased diameter from the inside to the outside of the series.

3. A tire casing having a carcass portion composed of a plurality of plies of material laid across the carcass in reversely folded courses, and anchoring rings in each bead edge enclosed by said folds, the rings in each bead edge being coaxial and of progressively increased diameter and lying closely adjacent in nested relation.

4. A tire casing having a carcass portion composed of a plurality of plies of material laid across the carcass in reversely folded courses, and anchoring rings in each bead edge enclosed by said folds, the rings in each bead edge being coaxial and of progressively increased diameter from the inside to the outside of the series and lying closely adjacent in nested relation.

5. A tire casing having a carcass portion composed of a plurality of plies of substantially equal cross-sectional periphery, and a plurality of anchoring means disposed in the bead portions of the casing and being of differing diameters to secure the several plies.

6. A tire casing having a carcass portion composed of a plurality of plies of substantially equal cross-sectional periphery and a plurality of anchoring hoops in each bead portion of the casing, each pair of plies being anchored by a separate hoop, and the hoops in each bead lying in a series of progressively increased diameters from the inside to the outside.

THOMAS MIDGLEY.